(12) United States Patent
Fasce et al.

(10) Patent No.: US 8,678,855 B2
(45) Date of Patent: Mar. 25, 2014

(54) BUNDLED WIRE GUIDE APPARATUS FOR CARRIER AND TELECOMMUNICATION MODULE ASSEMBLY

(75) Inventors: Xavier Fasce, Verchaix (FR); Guy Metral, Cluses (FR)

(73) Assignee: 3M Innovative Properties Company, St. Paul, MN (US)

( * ) Notice: Subject to any disclaimer, the term of this patent is extended or adjusted under 35 U.S.C. 154(b) by 8 days.

(21) Appl. No.: 13/574,290

(22) PCT Filed: Jan. 20, 2011

(86) PCT No.: PCT/US2011/021789
§ 371 (c)(1),
(2), (4) Date: Jul. 20, 2012

(65) Prior Publication Data
US 2012/0295475 A1 Nov. 22, 2012

Related U.S. Application Data

(60) Provisional application No. 61/300,165, filed on Feb. 1, 2010.

(51) Int. Cl.
*H01R 13/66* (2006.01)
(52) U.S. Cl.
USPC ............................................. 439/532
(58) Field of Classification Search
USPC ................................. 439/532, 534
See application file for complete search history.

(56) References Cited

U.S. PATENT DOCUMENTS

| | | | | |
|---|---|---|---|---|
| 3,992,654 A | * | 11/1976 | Springer et al. | 439/31 |
| 4,160,880 A | * | 7/1979 | Brey | 439/571 |
| 5,800,187 A | * | 9/1998 | Vermon et al. | 439/92 |
| 5,816,854 A | * | 10/1998 | Baggett et al. | 439/540.1 |
| 6,095,461 A | * | 8/2000 | Daoud | 248/65 |
| 6,223,909 B1 | | 5/2001 | Mendoza | |
| 7,828,567 B2 | * | 11/2010 | Bonvallat et al. | 439/165 |
| 2004/0132330 A1 | * | 7/2004 | Bonvallat et al. | 439/403 |
| 2005/0085119 A1 | * | 4/2005 | Schluter et al. | 439/395 |
| 2007/0082522 A1 | | 4/2007 | Bonvallat | |
| 2007/0264852 A1 | | 11/2007 | Bonvallat | |
| 2007/0275581 A1 | * | 11/2007 | Bonvallat et al. | 439/165 |
| 2008/0192414 A1 | * | 8/2008 | Metral | 361/679 |
| 2008/0240162 A1 | | 10/2008 | Perrier | |
| 2011/0281459 A1 | * | 11/2011 | Metral et al. | 439/540.1 |
| 2012/0295475 A1 | * | 11/2012 | Fasce et al. | 439/532 |

FOREIGN PATENT DOCUMENTS

| | | |
|---|---|---|
| EP | 1 160 604 A2 | 12/2001 |
| EP | 1 750 461 A1 | 2/2007 |
| EP | 1 993 296 A1 | 11/2008 |
| WO | 2005/094090 | 10/2005 |

* cited by examiner

*Primary Examiner* — James Harvey
(74) *Attorney, Agent, or Firm* — Janet A. Kling

(57) ABSTRACT

A bundled wire guide is insertable within an interior portion of a carrier/telecommunication module assembly. The bundled wire guide includes at least one channel configured to receive and guide at least a first wire bundle such that the at least one channel extends from a back frame of the carrier to a hinge portion of the telecommunication module and individual wires of the first wire bundle are insertable in the telecommunication module. The bundled wire guide, when installed as part of the carrier, provides one or more closed wire channels that mechanically protect the wire bundles. In addition, the bundled wire guide provides a mechanism to install wires through the back frame of the carrier without having to open or pivot the carrier/module assembly.

9 Claims, 5 Drawing Sheets

BUNDLED WIRE GUIDE APPARATUS FOR CARRIER AND TELECOMMUNICATION MODULE ASSEMBLY

CROSS REFERENCE TO RELATED APPLICATIONS

This application is a national stage filing under 35 U.S.C. 371 of PCT/US2011/021789, filed Jan. 20, 2011, which claims priority to U.S. Application No. 61/300,165, filed Feb. 1, 2010, the disclosure of which is incorporated by reference in its/their entirety herein.

The invention relates to a bundled wire guide apparatus that is utilized to guide one or more wire bundles within a carrier and a telecommunication module assembly.

BACKGROUND

In the field of telecommunications, numerous customers are connected with the switch of a telecommunications company over telecommunication lines. Such customers can also sometimes be referred to as subscribers. The switch is often called an exchange or "PBX" (central office exchange operated by the telecommunications company). Between the subscriber and the switch, sections of the telecommunication lines are connected with telecommunication modules. Telecommunication modules establish an electrical connection between one wire attached to the telecommunication module at a first side and another wire attached to the telecommunication module at a second side. The wires of one side can also be called incoming wires and the wires of the other side can be called outgoing wires.

Plural telecommunication modules can be put together at a distribution point such as a main distribution frame (or "MDF"), an intermediate distribution frame, an outside cabinet or at some other distribution point located, for example, in an office building or on a particular floor of an office building. At such distribution points, racks can be provided on which carriers are directly mounted, allowing plural telecommunication modules to be directly attached to the carriers. To allow flexibility in wiring some telecommunication lines are connected with a set of first telecommunication modules in a manner to constitute a permanent connection. Flexibility is realized by jumpers or cross-connects, which flexibly connect contacts of the first telecommunication modules with contacts of a set of second telecommunication modules. These jumpers can be changed, for example, when a person moves within an office building to a new telephone (i.e., a different telephone line) and he or she wants to keep a former telephone number. Such a change of jumpers can be called patching or cross-connecting. Within the telecommunication module disconnection points can be located in the electrical connection between the two sides. Disconnection plugs can be inserted at the disconnection points to disconnect the line. Protection plugs and magazines are also sometimes used. They are connected to the module and protect any equipment connected to the wires from overcurrent and overvoltage. Test plugs can also be inserted at a disconnection point to test or monitor a line.

Asymmetric Digital Subscriber Line, or "ADSL" technology is now widely utilized in the field of telecommunications. ADSL technology allows at least two different signals to be transmitted on a single line and is achieved by transmitting the different signals at different frequencies along the line. Signals are combined at a particular point in the telecommunication line and split at another point. In particular, at the subscriber side separate voice and data signals are combined and sent to the central office over one line. In the central office the combined signal is split. The voice signal is then directed to the other subscriber(s) on the telephone call, and the data signal is directed to the other subscriber(s) participating in the data exchange. For transmission of voice and data signals to the subscriber, separate voice and data signals are combined at the central office, sent to the subscriber and split at the subscriber side. After splitting, the POTS, or "plain old telephone service," can be used to transmit voice signals. The remaining portion of the split signal can be used to transmit data or other information. Splitters, which are used to split or combine the signal, can generally be arranged at any distribution point.

Any electronic components necessary to perform the above functions can be contained, sometimes together with a printed circuit board as a base, in a single splitter module. Other functional modules include protection modules, which contain components to provide protection against overvoltage and/or overcurrent, and testing and monitoring modules, which contain suitable electronic components to test and/or monitor a telecommunication line. Other functional modules or plugs are also known.

SUMMARY OF THE INVENTION

According to a first aspect of the present invention, a bundled wire guide is insertable within an interior portion of a carrier/telecommunication module assembly. The bundled wire guide includes at least one channel configured to receive and guide at least a first wire bundle such that the at least one channel extends from a back frame of the carrier to a hinge portion of the telecommunication module and individual wires of the first wire bundle are insertable in the telecommunication module.

According to another aspect of the invention, an assembly for telecommunications comprises a carrier having a frame configured to receive at least one telecommunication module, the carrier having a back frame and at least one side frame portion, wherein a telecommunication module is pivotably mounted to the carrier. The telecommunication module includes at least one row of contacts, wherein each contact is configured to be accessed from at least a first side of the module. The assembly further comprises a bundled wire guide having at least one channel configured to receive and guide at least a first wire bundle, the at least one channel extending from the back frame to a hinge portion of the telecommunication module.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The invention will be described in part by reference to illustrative embodiments depicted in drawings in which.

Figure 1A:
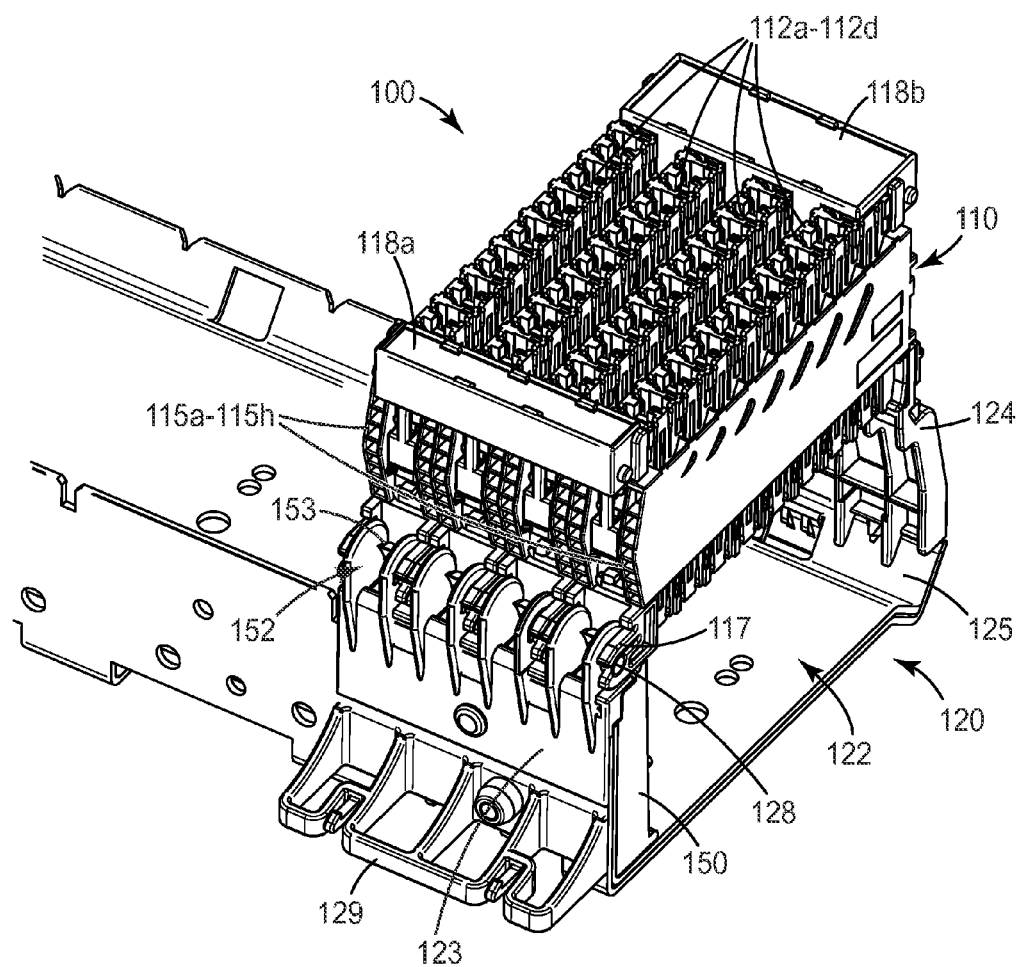
FIG. 1A is an isometric view of a bundled wire guide apparatus incorporated in a carrier and a telecommunication module assembly according to a first aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DESCRIPTION OF PREFERRED EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

In a first aspect of the invention, a bundled wire guide apparatus is provided that is utilized within a carrier to which one or more telecommunication modules are mountable. As described herein, in an exemplary aspect, the telecommunication module can be pivotable relative to the carrier so that additional components such as protection or splitter plugs may be added on the backside of the telecommunication module. In a preferred aspect, the bundled wire guide apparatus is integrated into the carrier (having a "back mount frame" design in exemplary embodiments) so that one or more wire bundles can be inserted through the back end of the carrier and guided past a hinge part of the pivotable assembly without having to release the assembly from its "normal" or non-pivoted (closed) position. Overall, the bundled wire guide apparatus aids the cable management aspect at the telecommunication distribution point and can improve the ease of installation.

In a first aspect of the invention, a bundled wire guide apparatus is provided that is utilized within a carrier to which one or more telecommunication modules are mountable. As described herein, in an exemplary aspect, the telecommunication module can be pivotable relative to the carrier so that additional components such as protection or splitter plugs may be added on the backside of the telecommunication module. In a preferred aspect, the bundled wire guide apparatus is integrated into the carrier (having a "back mount frame" design in exemplary embodiments) so that one or more wire bundles can be inserted through the back end of the carrier and guided past a hinge part of the pivotable assembly without having to release the assembly from its "normal" or non-pivoted (closed) position. Overall, the bundled wire guide apparatus aids the cable management aspect at the telecommunication distribution point and can improve the ease of installation.

Figure 1B:
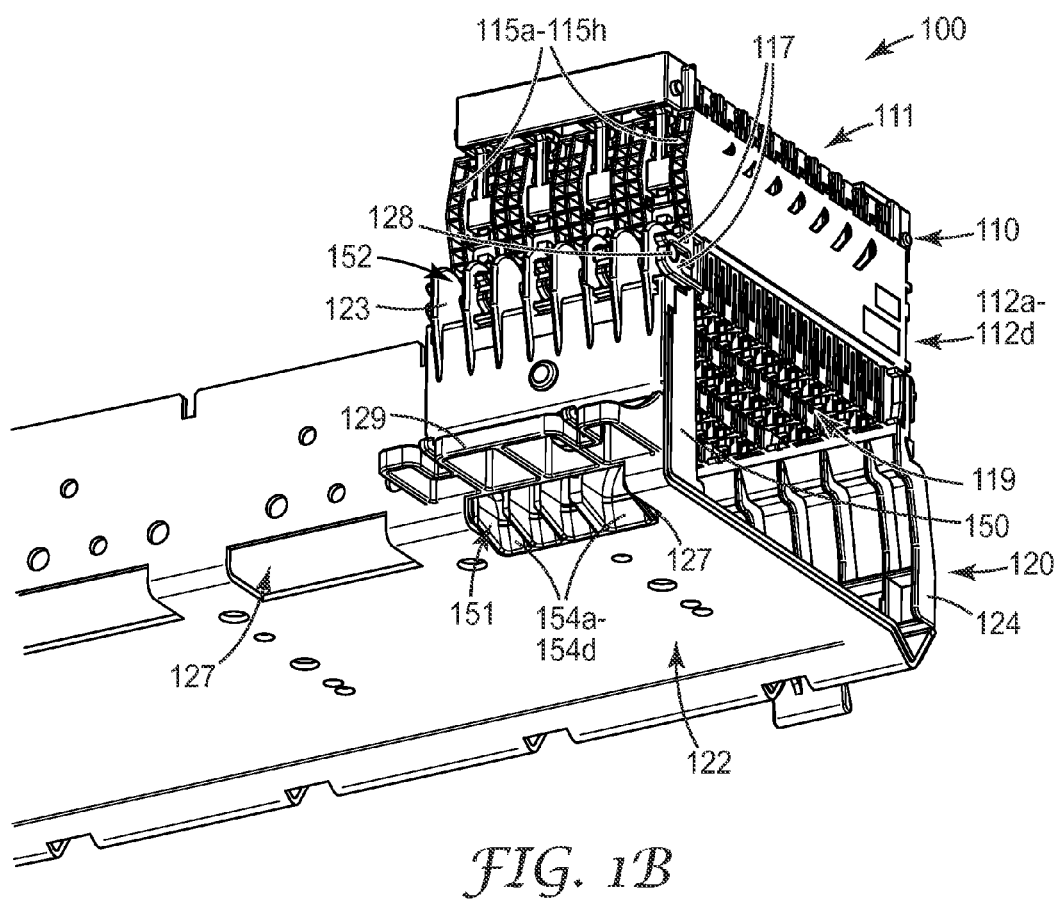
FIG. 1B is another isometric view of the bundled wire guide apparatus incorporated in a carrier and a telecommunication module assembly of FIG. 1A.

In more detail, FIGS. 1A and 1B show different views of an assembly 100 that includes a telecommunication module 110 mounted onto a carrier 120. The assembly 100 further includes a bundled wire guide apparatus 150 (referred to as a bundled wire guide) mounted to the carrier 120.

Overall, the carrier 120 is designed to securely mount the telecommunication module 110. In one aspect, the carrier can have any suitable shape. For example, the carrier can comprise one or more rails, bars, rods or wall-type elements. When two or more of such bars, rods etc., are present, they may be parallel to allow telecommunication modules to be mounted to two or more of these components in a manner in which they are moveable along the components. The carrier may also have a trough-like appearance with two opposing sidewalls to which telecommunication modules are mountable. Alternatively, the carrier can have an essentially "L"-shaped cross-section and the telecommunication modules can be mounted to one leg of the cross-section. This leg, as well as the above-mentioned walls, can comprise openings at regular intervals to define a predetermined spacing or pitch for the telecommunication modules mounted thereon. Some suitable carrier constructions are described in U.S. Patent Publication Nos. 2007-0264852-A1 and 2008-0240162-A1, incorporated by reference herein in their entirety. Any of the above-mentioned legs, walls, rails or the like can, apart from openings, comprise projections or any other suitable structures which define edges for cooperating with latching mechanisms (such as latch hooks) for mounting telecommunication modules to the carrier.

In an exemplary aspect of the invention, such as shown in FIGS. 1A and 1B, the carrier 120 comprises a back mount frame type structure having a bottom (or back) frame portion 122, a first sidewall (hinge side frame portion 123) and a second side wall (latch side frame portion 124). The carrier may comprise a single unitary structure or a multiple piece structure. In a preferred aspect, the bottom (back) frame portion 122 extends laterally so that it can be utilized to mount one or more additional telecommunication modules (not shown). In this manner, carrier 120 may support a block of telecommunication modules.

The carrier 120 is preferably configured to be mounted within a rack or cabinet (not shown) at a distribution point in a telecommunication network. In particular, the carrier 120 has an opening toward a "front" side where the telecommunication module 110 is mounted. The telecommunication module 110 can have a housing that may be made of plastic or any other suitable material and can be constituted by one or more components. The housing serves to accommodate telecommunication contacts (described below) to which telecommunication lines are connectable. The housing can also have specific structures for positioning the contacts. Moreover, the housing can comprise one or more cavities or receiving spaces adapted to accommodate the contacts and/or objects such as one or more protection modules or other module or module parts.

In particular, the telecommunication module 110 includes a plurality of termination strips 112a-112d. Each termination strip 112a-112d comprises a plurality of electrical contacts arranged in one or more rows. In the exemplary aspect of FIGS. 1A-1C, each termination strip 112a-112d comprises two rows of contacts. Each of the contacts comprising the termination strips 112a-112d are exposed on the front side 111 of the telecommunication module 110, which allows the straightforward connection or termination of telecommunication wires (not shown).

As mentioned above, the contacts are used to terminate telecommunication wires. In this context, telecommunication wires are considered relatively thin, elongate metallic objects, usually with an insulation (e.g., a jacket or coating) and adapted to transmit a signal. In the field of telecommunications, a telecommunication line usually includes a pair of wires. Plural wires or wire pairs can be combined to form a wire bundle.

In a further aspect, carrier 120 can further include a structure 129 formed or attached to the outer surface of the hinge side frame portion 123 that helps guide wires away from the module 110. For example, structure 129 can be utilized to manage excess wires, cables, and jumpers.

Figure 1C:
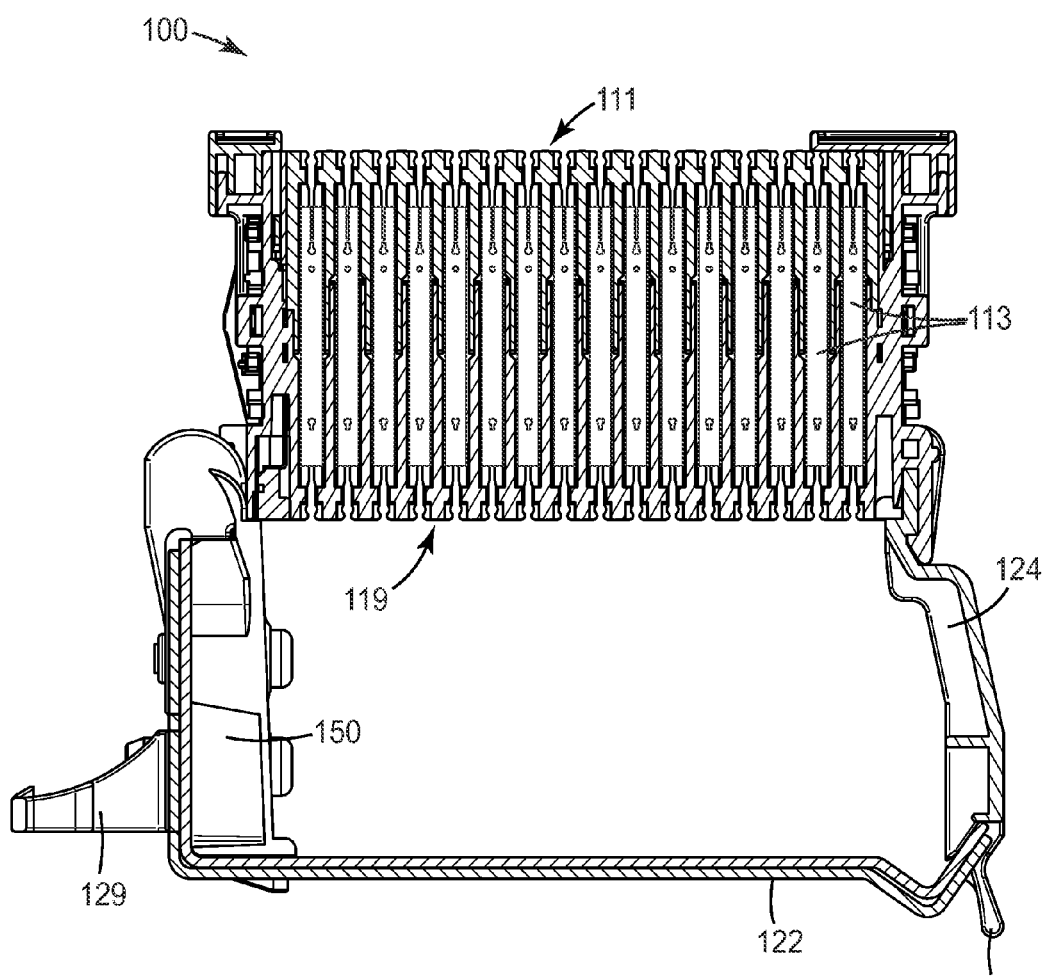
FIG. 1C is a partial cross-section view of the bundled wire guide apparatus incorporated in a carrier and a telecommunication module assembly of FIGS. 1A and 1B.

As shown in FIG. 1C, the plurality of contacts contained within the termination strips include individual contacts 113 that can extend from the "front" side 111 of the telecommunication module to the "rear" side 119 of the telecommunication module 110. On the rear side 119 of the telecommunication module, additional devices such as splitters and/or protection plugs can be connected. In a preferred aspect, the interior space between the rear side 119 of the module 110 and the back frame 122 is sufficient to accommodate a number of different additional devices. In an alternative aspect, contacts 113 may be formed as disconnection contacts. Of course, contacts 113 may have contact shapes other than that shown in FIG. 1C, depending on the particular application, as would be apparent to one of ordinary skill in the art given the present description.

In addition, module 110 further comprises a series of individual wire guide arrays 115a-115h. Each individual wire guide within the array can be configured to guide an individual/single wire or twisted pair of wires from a side of the module to an individual contact or contact pair located on the front side 111 of the module. The module 110 may also include one or more label blocks 118a, 118b to allow the user to place labels near the contact rows for wire identification and management purposes.

In another preferred aspect, the telecommunication module 110 is mounted to the carrier 120 in a pivotable manner. For this purpose, a pivot piece 128 (such as one or more post structures) is provided on the carrier 120. The telecommunication module 110 can include a complementary hinge portion or hinge 117, formed as a single or multiple piece structure, having one or more leg portions with a slit between them to flexibly receive the pivot piece. Thus, when the telecommunication module 110 is mounted to the carrier 120, the pivot piece 128 can be received by the hinge 117. In this exemplary aspect, latch side frame portion 124 may be disengaged from back frame 122 upon release of a latch 125 to place the assembly 100 in an "open" position. To secure the assembly 100 in its "normal" or non-pivoted (closed) position, latch 125 or a similar structure, can be formed on latch side frame portion 124 to flexibly engage the back frame 122. FIGS. 1A and 1B show assembly 100 in its "normal" position.

In an alternative aspect, the telecommunication module may be moveable in a substantially linear direction relative to the carrier. In further alternative aspects, the telecommunication module may be constructed to allow for both pivotable and linear movement.

In a preferred aspect, the bundled wire guide 150 guides wire bundles to the hinge/pivot piece of the assembly. With this configuration, pivotal movement of the assembly will at least not substantially move or deform the wire bundles at the hinge and their connection with the contacts of the module 110 is also not substantially affected during pivotal movement. Moreover, with the configuration of the bundled wire guide 150 and carrier 120, the assembly need not be opened in order to insert wire bundles through the back mount frame and into the telecommunication module.

Figure 2:
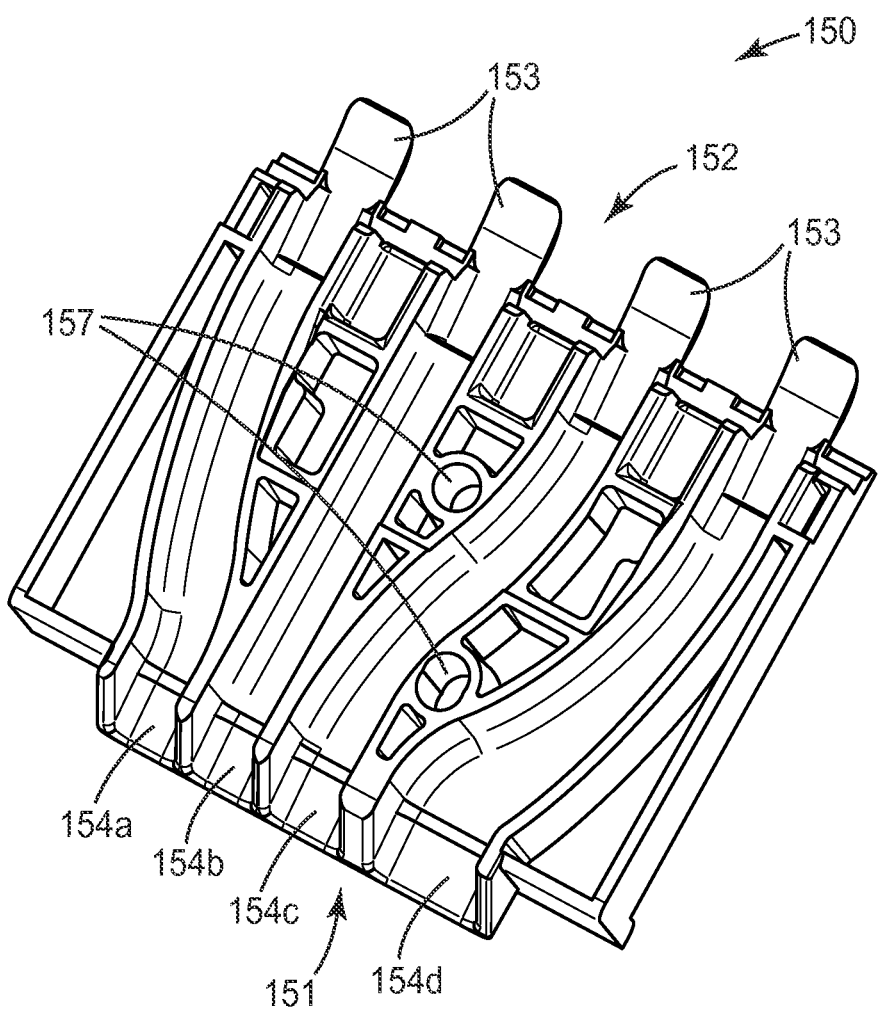
FIG. 2 is an isometric view of a bundled wire guide apparatus according to another aspect of the present invention.

FIG. 2 shows a more detailed view of bundled wire guide 150. Bundled wire guide 150 includes a first end 151 and a second end 152 and one or more bundled wire channels 154a-154d extending therethrough. In this exemplary aspect, first end 151 comprises the bundled wire "entrance" and second end 152 comprises the bundled wire "exit." Each of the channels preferably is of appropriate width to receive and guide a wire bundle having a number of wires corresponding to the number of contacts on a particular termination strip of the module 110. The channel side walls and bottom wall (shown in FIG. 2) combine with an interior surface of the hinge side frame portion to provide enclosed channels for the bundled wires. This closed structure can provide mechanical protection.

As shown in FIG. 1B, the entrance end 151 is mounted onto the back frame 122 of carrier 120. In particular, the entrance end 151 can be configured to fit within a slot or cut-out 127 formed in at least a portion of the back frame 122. As shown in FIG. 1A, the exit end 152 can be configured to provide bundled wire exits at the pivot piece/hinge of the carrier/telecommunication module.

The entrance to each channel 154a-154d is configured to be sufficiently sized to receive one or more wire bundles. As shown in FIG. 2, in a preferred aspect, the channels 154a-154d are shaped to fan out so that the channel exit ends line up with the position of at least one termination strip of the telecommunication module 110 (see also FIG. 1A). In a preferred aspect, the number of channels corresponds to the number of termination strips utilized on the telecommunication module 110. In this exemplary aspect, four channels are provided. For other module configurations, a fewer or a greater number of channels may be provided.

In a further aspect, bundled wire guide 150 may include one or more deflection tongues 153. In a preferred aspect, each channel 154a-154d includes a deflection tongue 153 formed at the second (exit) end 152 of the channels. The deflection tongues 153 are preferably shaped as slightly curved ramps that extend outward from the channel exits. The deflection tongues 153 deflect the bundled wires that exit the channels 154a-154d outward and away from the module so that the wires can be more easily manipulated to insert them in their proper individual wire guide array. In an alternative aspect, the channels do not include deflection tongues, thereby permitting bundled wires to be terminated on the rear side 119 of module 110.

In a further aspect, bundled wire guide 150 includes one or more through-holes 147 that receive conventional fasteners used to secure the bundled wire guide 150 to the carrier 120 at the hinge side frame portion 123.

Thus, in a preferred aspect of the present invention, the bundled wire guide 150, when installed as part of the carrier, provides one or more closed wire channels that mechanically protect the wire bundles. In addition, the bundled wire guide provides a mechanism to install wires through the back mount frame without having to "open" or pivot the carrier/module assembly. The fan out structure of the channels within the bundled wire guide 150 can also ensure that bundled wires are aligned to their appropriate contact row/termination strip at the point of insertion.

Figure 3:
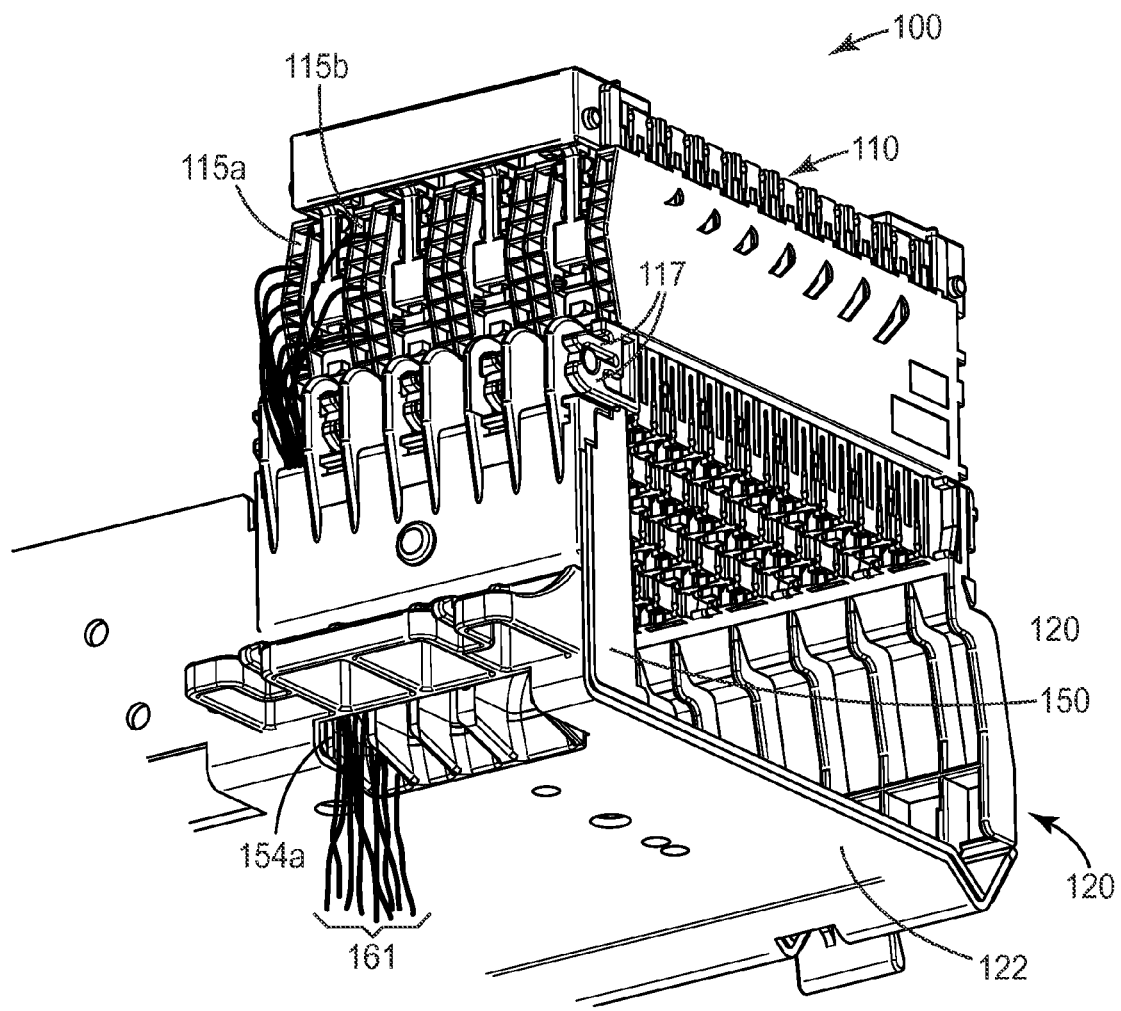
FIG. 3 is an isometric view of a bundled wire guide apparatus incorporated in a carrier and a telecommunication module assembly that is receiving a wire bundle according to another aspect of the present invention.

For example, FIG. 3 shows a partial view of an assembly 100 when populated by a wire bundle 161. The wire bundle 161 comprises a plurality of wires/wire pairs that are inserted in channel 154a of the bundled wire guide 150. The bundled wire guide 150 provides a closed channel through the carrier, exiting at the hinge 117 region of the telecommunication module 110. The bundled wires 161 exit the bundled wire guide 150 at the appropriate contact row of the module 110 so that an individual wire can be easily inserted in the appropriate individual wire guide of wire guide arrays 115a or 115b. In practice, the bundles are dispatched into the appropriate individual wire guides to be terminated in a pair by pair manner.

Although the bundled wire guide 150 is shown in conjunction with the carrier/telecommunication module assembly 100 of FIGS. 1A-3, the bundled wire guide 150 may be utilized with other carrier/telecommunication module designs, as would be apparent for one of ordinary skill in the art given the present description.

Various modifications, equivalent processes, as well as numerous structures to which the present invention may be applicable will be readily apparent to those of skill in the art to which the present invention is directed upon review of the present specification.

We claim:

1. An assembly for telecommunications, comprising:
   a carrier having a frame configured to receive at least one telecommunication module, the carrier having a back frame and at least one side frame portion,
   wherein a telecommunication module is pivotably mounted to the carrier;
   wherein the telecommunication module includes at least one row of contacts, wherein each contact is configured to be accessed from at least a first side of the module; and
   a bundled wire guide having at least one channel configured to receive and guide at least a first wire bundle, the at least one channel extending from the back frame to a hinge portion of the telecommunication module,
   wherein the telecommunication module comprises a plurality of termination strips that each include at least one row of contacts, each termination strip accessible by an individual wire guide array, and wherein the at least one channel comprises a plurality of channels with each channel configured to receive and guide a wire bundle and wherein each channel has an exit end positioned at an entrance area of an individual wire guide array.

2. The assembly of claim 1, wherein the at least one channel is enclosed throughout the carrier.

3. A bundled wire guide insertable within an interior portion of a carrier/telecommunication module assembly, comprising:
   at least one channel configured to receive and guide at least a first wire bundle such that the at least one channel extends from a back frame of the carrier to a hinge portion of the telecommunication module and individual wires of the first wire bundle are insertable in the telecommunication module,
   wherein the at least one channel comprises a plurality of channels, wherein the plurality of channels are arranged in a fan out configuration from a bundled wire guide entrance end to a bundled wire guide exit end.

4. The bundled wire guide of claim 3, wherein each channel further includes a deflection tongue formed at the exit end of each channel and extending outward therefrom.

5. The assembly of claim 1, wherein the plurality of channels are arranged in a fan out configuration from a bundled wire guide entrance end to the exit end.

6. The assembly of claim 1, wherein each channel further includes a deflection tongue formed at the exit end of each channel and extending outward from the hinge.

7. The assembly of claim 1, wherein the at least one side frame portion comprises a hinge side frame portion and a latch side frame portion each disposed on the back frame opposite one another, and wherein the bundled wire guide is attached to the hinge side frame portion in an interior area of the carrier.

8. The assembly of claim 7, wherein the at least a first wire bundle comprises a plurality of wire bundles, and wherein each wire bundle is insertable through the bundled wire guide and installable in the telecommunication module when the assembly is in a non-pivoted position.

9. The bundled wire guide of claim 4, wherein each deflection tongue extends outward from the hinge portion of the telecommunication module when the bundled wire guide is installed.

* * * * *